United States Patent [19]

Ellis

[11] 4,235,293
[45] Nov. 25, 1980

[54] SELF-CLEANING FAN HOUSING

[75] Inventor: Malcolm P. Ellis, Ashland, Me.

[73] Assignee: Thomas Equipment Ltd., Centreville, Canada

[21] Appl. No.: 57,934

[22] Filed: Jul. 16, 1979

[30] Foreign Application Priority Data

May 17, 1979 [CA] Canada ................................. 327818

[51] Int. Cl.³ .......................................... A01D 33/02
[52] U.S. Cl. ..................................... 171/17; 56/12.8;
56/16.5; 406/100
[58] Field of Search .......................... 171/12, 17, 124;
56/12.8, 12.9, 13.1, 13.2, 16.5; 130/27 S, 27 L,
27 Z; 406/100

[56] References Cited

U.S. PATENT DOCUMENTS

| 2,373,426 | 4/1945 | Spafford | 171/17 |
| 2,829,925 | 4/1958 | Monteil | 406/100 |
| 3,227,776 | 1/1966 | Leighton et al. | 171/17 |
| 3,316,025 | 4/1967 | Sullivan et al. | 406/97 |
| 4,174,001 | 11/1979 | Ellis | 56/16.5 |

FOREIGN PATENT DOCUMENTS

| 2310171 | 9/1974 | Fed. Rep. of Germany | 56/16.5 |
| 2409630 | 10/1974 | Fed. Rep. of Germany | 406/100 |

Primary Examiner—Robert A. Hafer
Attorney, Agent, or Firm—Lawrence I. Field

[57] ABSTRACT

A fan housing comprising two side plates and a scroll, angle elongated scraper members secured transversely between the side plates, the scroll resting on the scraper members and being slideably mounted on the side plates, and a reciprocating actuator secured to the scroll such that upon operation of the actuator, the scroll is oscillated across the scraper members so dislodging deposit from the inside of the scroll.

7 Claims, 7 Drawing Figures

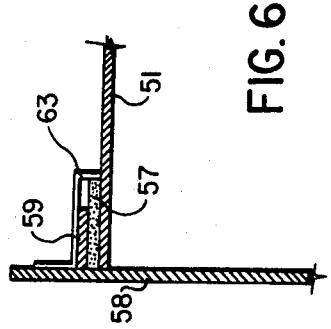
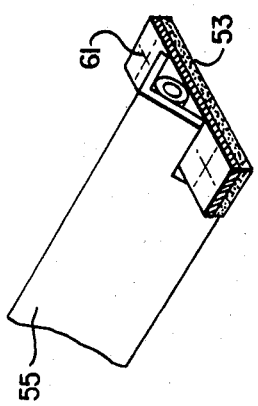
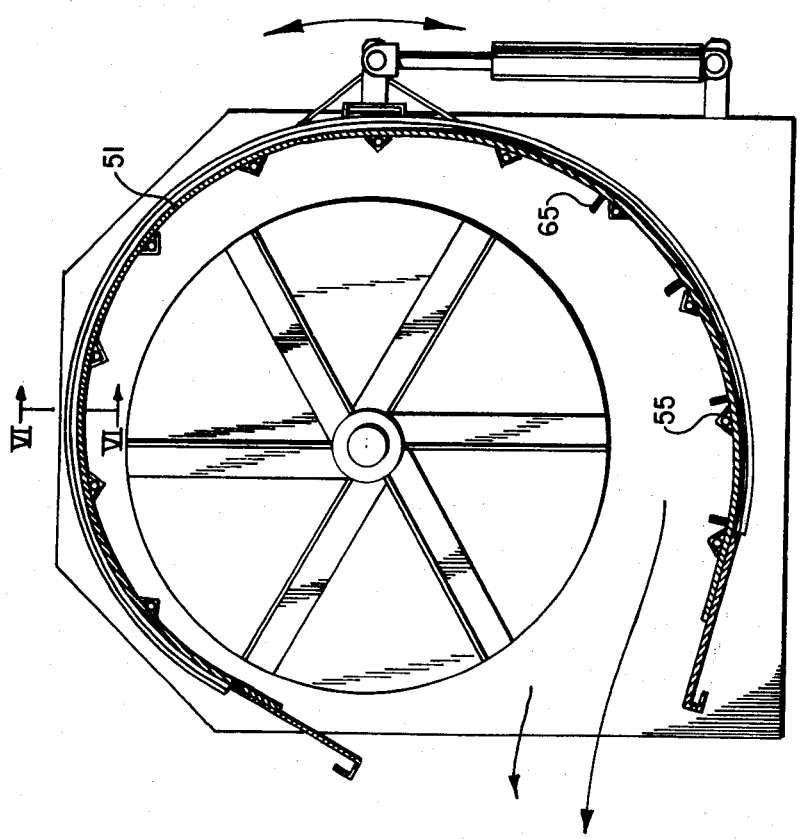

SELF-CLEANING FAN HOUSING

This invention relates to fan housing having a self-cleaning feature, and more specifically to a fan housing through which mud, dirt and other sticky substances are passed during operation. This environment is encountered by the fan housing which is utilized in a root-harvesting machine, such as a potato harvester, this fan housing forming part of the vacuum chamber.

BACKGROUND OF INVENTION

Fans in general operate in environmental conditions which usually permit hours of maintenance-free operation before cleaning is required. This applies also to fans used for removing air-borne particles from the air or dirt from surfaces, for example, vacuum cleaners, air conditioners and similar devices. Such fans periodically require cleaning but this is not expensive nor too aggravating due to the infrequency of the cleaning.

In the case of a fan operating in an environment where there are very large quantities of extremely sticky substances, the continual requirement to stop and clean-out the fan is both aggravating and expensive in terms of down time.

The "state of the art" potato harvester utilizes a fan which does not work in such an environment. The potato harvester digs up the potatoes, together with rocks, mud, weeds and grasses and conveys most of the mixture to a separator. The separator has a vacuum chamber which includes a system of conveyors and a suction fan. The suction or partial vacuum created inside the vacuum chamber lifts the potatoes which are lighter from a main conveyor onto a potato conveyor permitting the heavier foreign particles, such as rocks to remain on the main conveyor.

It will be apparent that, during operation, in addition to lifting potatoes, there are other sticky substances, such as mud and dirt drawn through the fan housing of the vacuum chamber. If the harvesting conditions are wet, as is quite often the case, then there is a rather rapid build-up of sticky substances on the inner surface of the fan housing. This build-up may become so great as to reduce the effectiveness of the fan to such a degree that the entire potato harvesting machine has to be shut down while the fan housing is cleaned out, usually by manually scraping the build-up from around the inside of the housing.

At the present time, there is a self-cleaning fan housing known in which a strip of conveyor belting is trained around transverse rods so that it is held close to the scroll of the fan housing. While this self-cleaning housing is a great improvement upon housings having no self-cleaning features, it is liable to lose its effectiveness and become inoperative by the build-up of dirt and mud between the conveyor belt and the fan housing. Due to the numerous wear points, there is also a good possibility of the conveyor belt breaking and becoming entangled with the fan so creating extensive damage.

SUMMARY OF INVENTION

This invention provides a self-cleaning fan housing that can be cleaned out without stopping the fan and without stopping the harvesting operation. This self-cleaning feature involves oscillating the scroll of the fan when required so that the inside face of the scroll is scraped by transverse scrapers which are fixed between the sides of the fan housing. The self-cleaning fan is of simple construction and is not prone to excessive wear or break-down.

DRAWINGS

The invention will now be described with reference to the accompanying drawings in which:

FIG. 5 is a cross sectional view similar to FIG. 3 of a second embodiment of the invention;

FIG. 6 is a cross sectional view of one side of the fan housing taken on the line 6—6 of FIG. 5; and FIG. 7 is an enlarged view of one end of a scraper of FIG. 5.

DETAILED DESCRIPTION OF INVENTION

Figure 1:
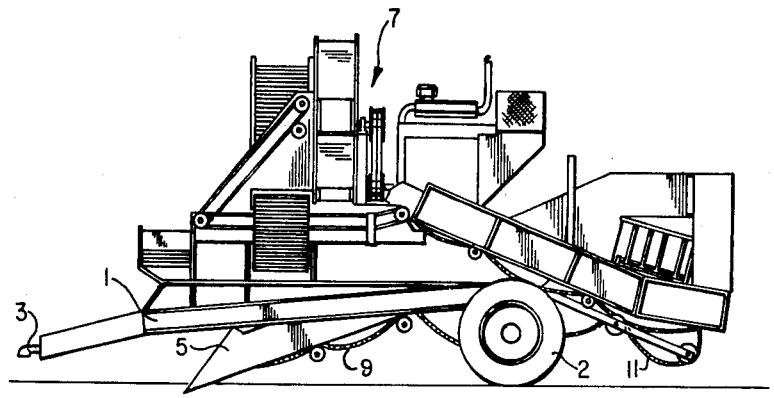
FIG. 1 is a side view of a potato harvesting machine employing a vacuum chamber, including the self-cleaning fan housing in accordance with this invention.
Figure 2:
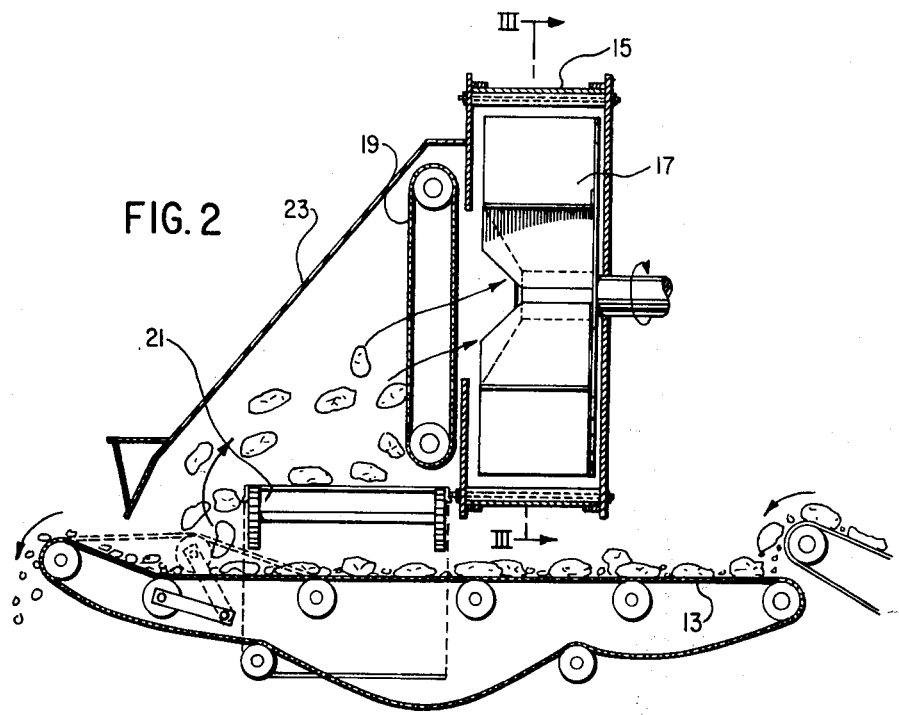
FIG. 2 is a cross sectional view of the vacuum chamber part of the potato harvester of FIG. 1.

Referring to FIG. 1, there is shown a potato harvester having generally a frame 1 mounted upon wheels 2 for towing with a hitch 3. A digger section 5 lifts potatoes, rocks and mud from a potato field and carries it up to a vacuum chamber 7 by conveyors, the return runs of which are shown at 9 and 11. The conveyors are formed of rubberized links which permit small and dry material to drop through to the ground while being transported upwardly. The vacuum chamber 7 is shown in more detail in FIG. 2, in which potatoes and debris are shown being transported from right to left upon conveyor 13. The vacuum chamber includes a fan scroll 15, a set of fan blades 17, a vertical moveable conveyor-like barrier 19, a cross conveyor 21, and a shroud 23. The potatoes and debris are passed beneath the vacuum chamber and suction caused by the fan 17 lifts the potatoes from conveyor 13 and deposits them on cross conveyor 21, the vertical conveyor barrier 19 preventing potatoes from passing through the fan. Stones are deposited from the left hand end of conveyor 13.

As will be appreciated, a large amount of soil which is often sticky is also drawn up with the potatoes and is deposited mainly upon the scroll 15.

Figure 4:
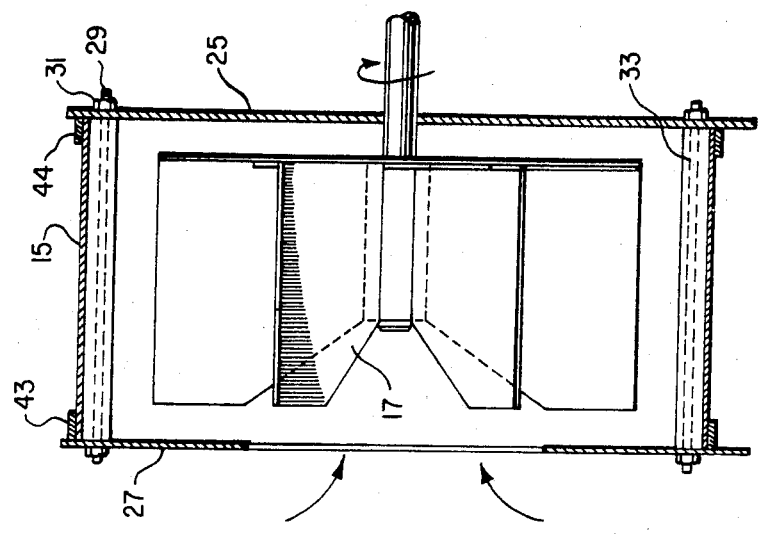
FIG. 4 is a cross sectional view on line 4—4 of FIG. 3.
Figure 3:
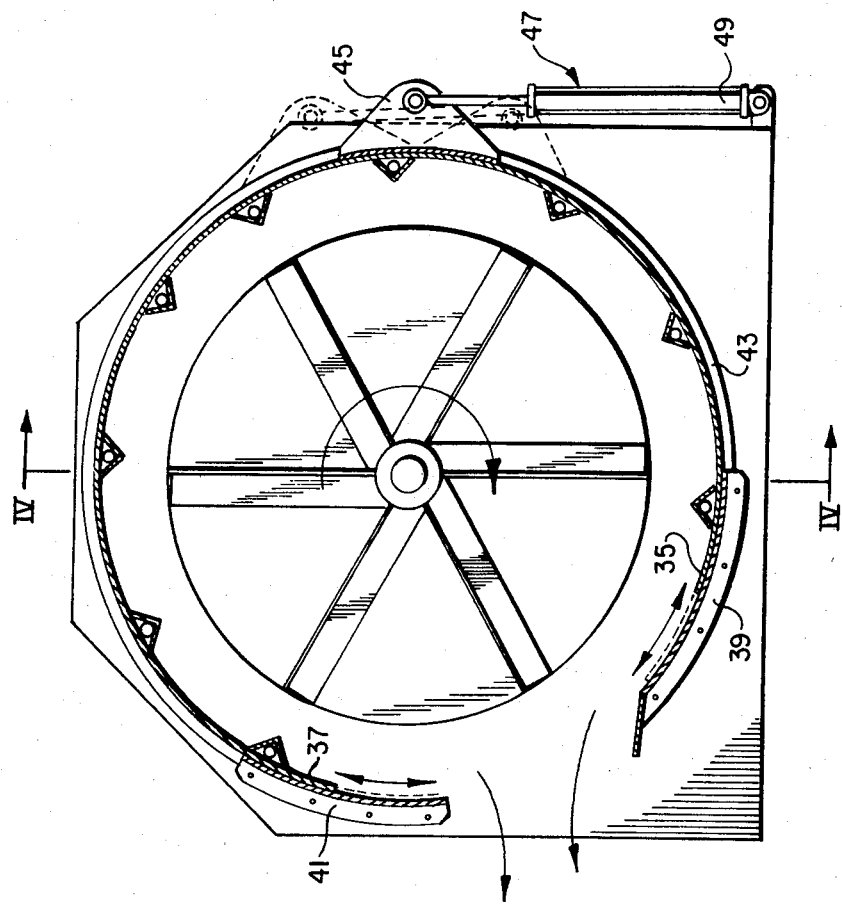
FIG. 3 is a cross sectional view on line 3—3 of FIG. 2.

FIGS. 3 and 4 illustrate the fan in more detail. The fan housing consists of the scroll 15 and side plates 25 and 27. The side plates are held together by bolts 29 and nuts 31 and are spaced parallel to one another by angle scrapers 33. The scrapers 33 are secured in place by welding or the like to rods 29 and to side plates 25 and 27 if required.

The scroll 15 is positioned around the scrapers 33 and held in contact therewith by guide strips 43 and 44 which are welded to side plates 25 and 27, respectively. The ends 35 and 37 of the scroll 15 are guided by bearing plates 39 and 41, respectively. A bracket 45 is welded to the outside of scroll 15 and to this bracket is pivotally attached a reciprocating actuator, such as a double-acting piston, and cylinder arrangement 47, the lower end of the cylinder 49 being pivotally mounted to a fixed portion of the vacuum chamber.

In order to clean sticky and caked material deposit from the scroll 15, it is only necessary to pressurize the cylinder 49 repeatedly from both ends so oscillating the scroll 15 as shown by the broken lines and scraping the scroll 15 clean against the scrapers 33. The scraped-off deposit will then be ejected by the fan or fall from the fan housing outlet.

In FIGS. 5, 6, and 7, there is shown a second embodiment of the invention which has a modified shape of scroll 51 which is of slightly oval shape, being closer to the fan blades at the top of the scroll than at the bottom, so enabling easier ejection of debris scraped from the scroll. The scroll 51 is also mounted so that it can be oscillated very easily and have a low wear rate and a long life. This is achieved by placing anti-friction wear strips 53 between the ends of the angle scrapers 55 and scroll 51, and anti-friction wear strips 57 between the guide strips 59, which are welded to the side plates 58 of the fan housing and the scroll 51. The wear strips 53 can be held in place by rivets or bolts to a backing plate 61, whereas the wear strips 57 are preferably held in place by retainer brackets 63 which are rivetted or bolted to side plates 58. Obviously wear strips could also be used in the embodiment of housing shown in FIG. 3.

As a further feature, pusher blades 65 are welded to scroll 51 to physically push the built-up deposit against the scrapers 55 to enhance the operation by preventing sticky deposit from forming a cake below which the scroll 51 could possibly slide without removing the cake. The pusher blades 65 could also be used with the embodiment of housing shown in FIG. 3.

The embodiments of the invention in which an exclusive property or privilege is claimed are defined as follows:

1. A fan housing comprising two side plates and a scroll, angle elongated scraper members secured transversely between the side plates, the scroll resting on the scraper members and being slideably mounted on side plates, and a reciprocating actuator secured to the scroll such that upon operation of the actuator, the scroll is oscillated across the scraper members so dislodging deposit from the inside of the scroll.

2. The housing of claim 1 wherein the scroll is slideably mounted on the side plates with guide strips which are secured to the side plates to form a circumferential inwardly facing bearing surface.

3. The housing of claim 1 or 2, wherein the scroll is substantially cylindrical.

4. The housing of claim 1 or 2, wherein the scroll has substantially oval configuration in a plane parallel to the side plates.

5. The housing of claim 1 or 2, including pusher bars transversely secured to the scroll between the limits of relative oscillation of the scraper members to the scroll.

6. The housing of claim 1 or 2, including anti-friction wear strips secured at the ends of the scraper members to support and provide a bearing surface for the scroll.

7. The housing of claim 2, including anti-friction wear strips secured along the radially inner side of the guide strips to provide a bearing surface for the scroll.

* * * * *